United States Patent
Lebaudy et al.

(10) Patent No.: US 6,779,811 B2
(45) Date of Patent: Aug. 24, 2004

(54) HYBRID GAS GENERATOR UNIT USED IN MOTOR VEHICLE SAFETY FOR INFLATING A SIDE AIRBAG

(75) Inventors: Franck Lebaudy, Loperhet (FR);
Francois Peremarty, Quimper (FR);
Christian Perotto, Ergue-Gaberic (FR)

(73) Assignee: Livbag SNC, Paris (FR)

( * ) Notice: Subject to any disclaimer, the term of this patent is extended or adjusted under 35 U.S.C. 154(b) by 0 days.

(21) Appl. No.: 10/247,367

(22) Filed: Sep. 20, 2002

(65) Prior Publication Data

US 2003/0075904 A1 Apr. 24, 2003

(30) Foreign Application Priority Data

Oct. 19, 2001 (FR) ............................................. 01 13490

(51) Int. Cl.[7] .......................... B60R 21/22; B60R 21/26
(52) U.S. Cl. ..................... 280/730.2; 280/736
(58) Field of Search ............................ 280/730.2, 736, 280/737, 741, 742

(56) References Cited

U.S. PATENT DOCUMENTS

| | | | | |
|---|---|---|---|---|
| 5,593,180 A | * | 1/1997 | Cuevas et al. | 280/741 |
| 5,967,550 A | | 10/1999 | Shirk et al. | 280/736 |
| 6,145,876 A | | 11/2000 | Hamilton | 280/736 |
| 6,170,867 B1 | * | 1/2001 | Rink et al. | 280/736 |
| 6,460,873 B1 | * | 10/2002 | Lebaudy et al. | 280/728.1 |

FOREIGN PATENT DOCUMENTS

WO    WO 01/34516 A2    5/2001

OTHER PUBLICATIONS

U.S. patent application Ser. No. 10/247,361, Lebaudy et al., filed Sep. 20, 2002.

* cited by examiner

Primary Examiner—Paul N. Dickson
(74) Attorney, Agent, or Firm—Oliff & Berridge, PLC

(57) ABSTRACT

A hybrid gas generator unit (1) used to inflate at least one side airbag, comprises
  a flexible element (9) containing a pyrotechnic charge (10) and possessing an upstream end (13) and a downstream end;
  a reservoir (18) of pressurized gas (19), the reservoir having an upstream end and a downstream end (30), and
  an electropyrotechnic igniter (3) housed in a body (2) near the upstream end (13) of the flexible element and the downstream end (30) of the reservoir.

The igniter may be capable during operation of initiating the combustion of the pyrotechnic charge contained in the flexible element and of causing the pressurized gas contained in the reservoir to be released.

The gas generator unit may be designed so that, after combustion of the pyrotechnic charge (10), the pressurized gas (19) escapes firstly from the reservoir (18) in order to pass through the body (2) and then sets off in the opposite direction to pass through the flexible element (9).

9 Claims, 2 Drawing Sheets

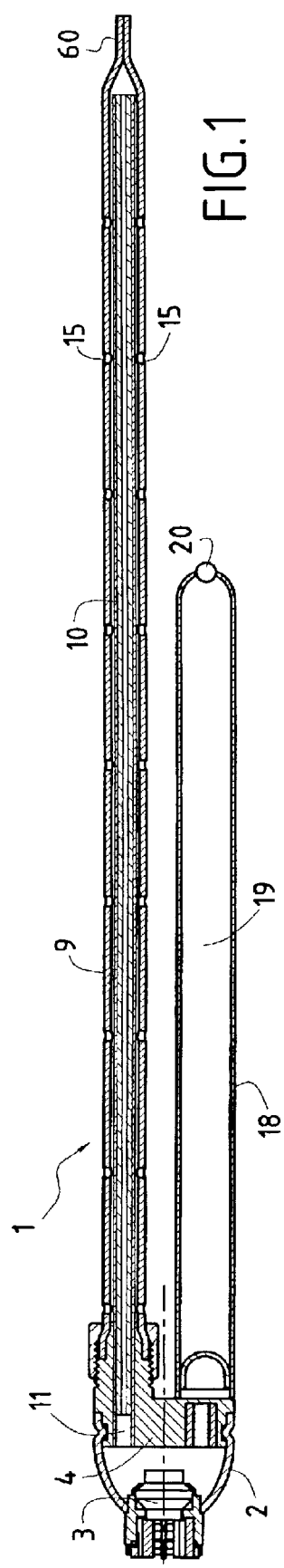
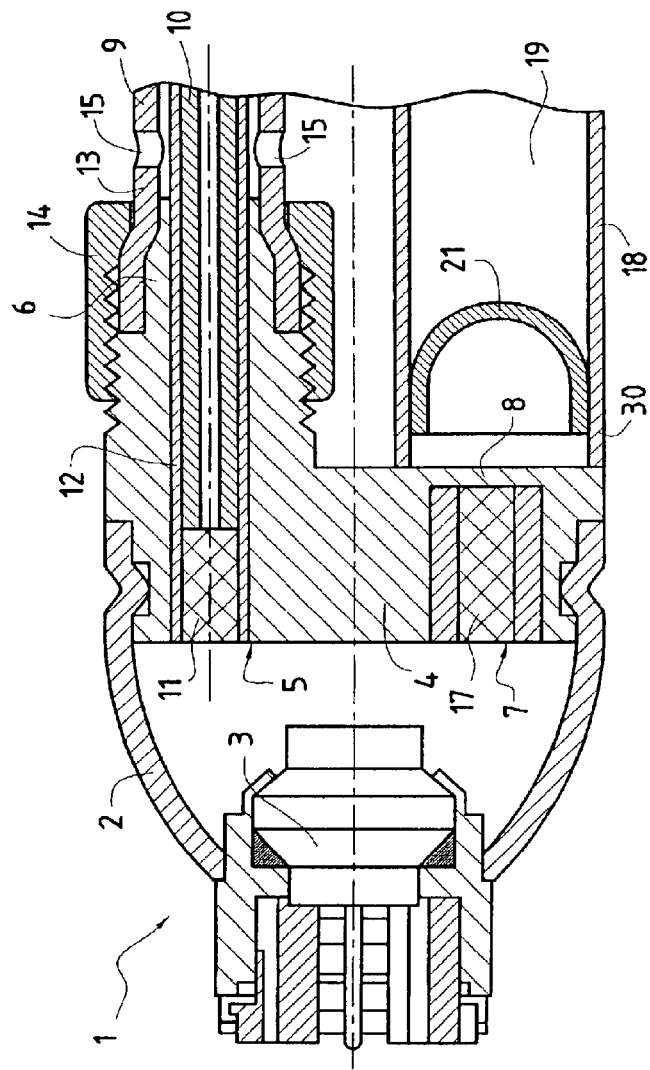

HYBRID GAS GENERATOR UNIT USED IN MOTOR VEHICLE SAFETY FOR INFLATING A SIDE AIRBAG

BACKGROUND OF THE INVENTION

1. Field of Invention

The present invention relates to the field of motor vehicle safety and concerns a hybrid gas generator unit.

2. Description of Related Art

In recent years, new generators called adaptive generators have appeared, for limiting the risk of body injuries brought about by deployment of the airbag. To do this, these various generators, coupled to suitable detection systems, allow the flow rate and/or the volume of gas to be modulated according to certain parameters such as, for example, the morphology and the position of the passenger, the ambient temperature, and the nature and intensity of the impact. These generators are in all cases designed to operate within a time period of about fifty milliseconds.

Very recently, motor vehicle manufacturers wanted to incorporate devices using inflatable airbags to protect occupants, not only when the vehicle rolls over after a side impact. To do this, the airbags must remain inflated for some ten seconds. U.S. Pat. No. 5,967,550 discloses a generator provided with two pyrotechnic charges, the first serving to inflate the airbag within milliseconds after the accident and the second keeping the airbag inflated for some ten seconds. However, owing to the particular geometry of this generator, the latter cannot be easily integrated into all motor vehicles.

A device has therefore been proposed, as in patent application WO 01/34516, which comprises, on the one hand, a main body containing an electropyrotechnic igniter and a first pyrotechnic charge and, on the other hand, a tube attached to the main body and containing a second pyrotechnic charge consisting of powder particles. This device has the advantage, over the abovementioned generator, of possessing a compact main body coupled to a tube that can easily be housed along the vehicle's roof. However, because of the use of two separate pyrotechnic charges, the cost of manufacturing such a device is relatively high, this being prejudicial in a competitive market such as that of the motor vehicle industry. In addition, the use of a pyrotechnic charge in the form of powder particles in the tube is detrimental since, in operation, very hot particles are in the airbag and these can cause premature degradation of the latter. Moreover, the use of a pyrotechnic charge to generate gas during a period of some ten seconds has the effect that the surface of the device is maintained at a temperature of about several hundred degrees Celsius over this time period. This may be damage for the airbag or the vehicle furnishings near the device.

A person skilled in the art is therefore always looking for a device for alleviating the abovementioned problems.

SUMMARY OF THE INVENTION

The subject of the present invention relates to a hybrid gas generator unit used for motor vehicle safety to inflate at least one side airbag, characterized in that it comprises:

- a flexible element containing a pyrotechnic charge and having an upstream end and a downstream end;
- a reservoir of pressurized gas, the said reservoir having an upstream end and a downstream end;
- an electropyrotechnic igniter housed in a body located near the upstream end of the flexible element and the downstream end of the reservoir; and
- the said igniter being capable during operation, on the one hand, of initiating the combustion of the pyrotechnic charge contained in the flexible element and, on the other hand, of causing the pressurized gas contained in the reservoir to be released.

This generator unit, apart from the fact that it possesses a geometry allowing it to be integrated into all kinds of motor vehicles, therefore has a greatly reduced manufacturing cost owing to the use of a pressurized gas reservoir instead of a pyrotechnic charge.

Preferably, the pyrotechnic charge contained in the flexible element is capable of generating a volume of gas sufficient to fully inflate the airbag in a time period of less than forty milliseconds. Moreover, in operation, the pressurized gas contained in the reservoir is released so as to keep the airbag inflated for a time period of the order of several seconds. This pressurized gas is uniformly released only from the moment when the airbag has been fully inflated after the combustion of the pyrotechnic charge.

Advantageously, the pyrotechnic charge contained in the flexible element is produced in the form of a cylindrical block which, on the one hand, preferably has a length very much greater than its diameter and, on the other hand, is provided with a central channel. Again, advantageously, this pyrotechnic charge consists of a composite propellant comprising a charge based on ammonium perchlorate, sodium nitrate and an inert binder.

Preferably, a heat-shrunk pliant sleeve grips and confines the pyrotechnic charge contained in the flexible element.

Advantageously, the electropyrotechnic igniter initiates, on the one hand, the combustion of the pyrotechnic charge contained in the flexible element and causes, on the other hand, the pressurized gas contained in the reservoir to be released by means of booster charges.

Preferably, the upstream end of the flexible element and the downstream end of the reservoir are attached to a ring which is itself fastened in the body.

Also preferably, this device is designed so that, after combustion of the pyrotechnique charge, the gas escapes from the reservoir in order to pass through the body and then leaves in a substantially opposite direction in order to pass through the flexible element.

Again, advantageously, the flexible element is produced using a pliant tube made of a thermoplastic, provided with outlet orifices uniformly distributed over its circumference and along its length. Since the pyrotechnic charge is housed in the tube, all that is therefore required is to adapt the length of this tube to the size of the airbag used. In addition, the choice of such a material to form the tube makes the generator unit safer since, in the event of abnormal pressurization, any spraying of metal parts liable to injure an occupant is prevented.

BRIEF DESCRIPTION OF THE DRAWINGS

FIG. 1 is a longitudinal sectional view of a hybrid gas generator unit according to the invention.

FIG. 2 is an enlarged partial longitudinal sectional view of the generator unit shown in FIG. 1.

DETAILED DESCRIPTION OF PREFERRED EMBODIMENTS

Figure 3:
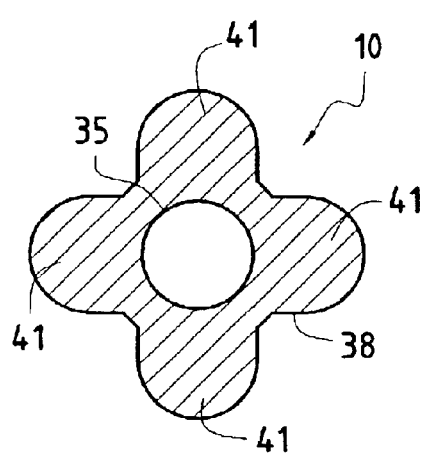
FIG. 3 is a cross-sectional view of a first pyrotechnic charge that can be housed in the flexible element.

FIGS. 1 and 2 show that a hybrid gas generator unit 1 according to the invention, is produced from a body 2 having, on the one hand, a first open end via which an electropyrotechnic igniter 3 is inserted and then fastened by welding and, on the other hand, a second open end of larger diameter, by which a ring 4 is introduced and then fastened by crimping. More specifically, this ring 4 possesses, on the one hand, a first channel 5 which passes through the ring over its entire length and which is extended by a conical nose 6 and, on the other hand, a second channel 7 hollowed out over practically its entire length, so as to leave only a thin solid end 8 that can act, in operation, as a frangible membrane.

The first channel 5 is intended to receive a pyrotechnic charge which is itself incorporated into a pliant tube 9 made of a thermoplastic. More specifically, the pyrotechnic charge is produced in the form of a cylindrical block 10 possessing, on one side, an upstream end placed in contact with a first booster charge 11 and, on the other side, a downstream end, a heat-shrunk pliant sheath 12 gripping the whole assembly. The upstream end of the pyrotechnic charge thus confined is inserted into the first channel 5 after having passed through the conical nose 6. The tube 9 possesses, on one side, an upstream end 13 which is fitted onto the conical nose 6 of the ring 4 and to which a collar 14 fastened by screwing into the said ring 4 is attached and, on the other side, a downstream end which is swaged and which, after welding, allows a sealed plug 60 to be formed. The tube 9 also has gas outlet orifices 15 which are uniformly distributed over its circumference and along its length. A second booster charge 17 is placed in the second channel 7 so as to be in contact with the solid end 8 of the ring 4.

A reservoir 18 of pressurized gas 19 is produced from a metal body having, on one side, an open dowstream end 30 and, on the other side, an upstream end having an orifice for filling it with gas 19, the said orifice being closed off by a plug 20 fastened by welding. More specifically, a cylindrical metal piece 21 provided with a central passage (not shown) forming an internal nozzle is introduced into the reservoir 18 and is press-fitted into it near the downstream end 30 of the said reservoir 18. The reservoir 18 provided with the metal piece 21 is finally fastened by welding to the ring 4 so that the downstream end 30 of the said reservoir 18 is located opposite the solid end 8 of the said ring 4.

Figure 4:
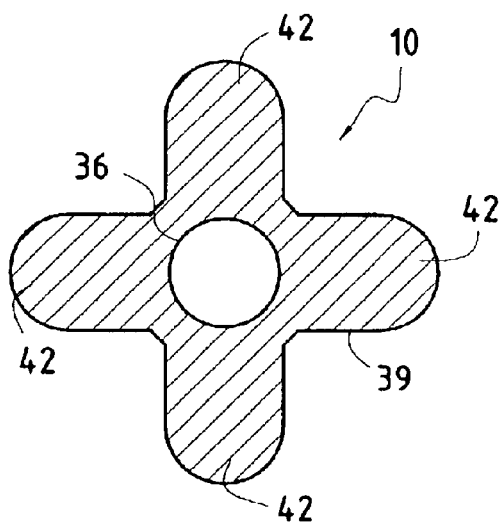
FIG. 4 is a cross-sectional view of a second pyrotechnic charge that can be housed in the flexible element.
Figure 5:
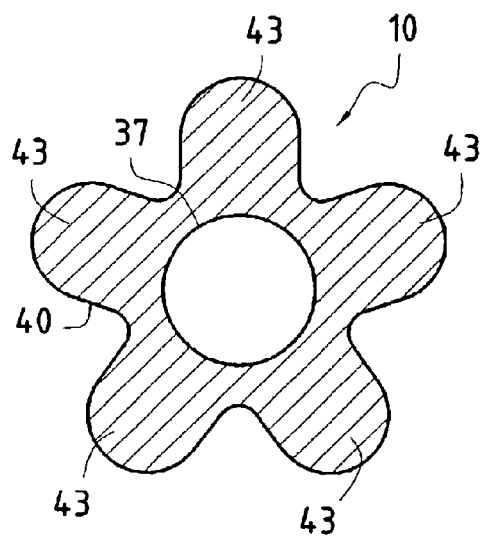
FIG. 5 is a cross-sectional view of a third pyrotechnic charge that can be housed in the flexible element.
Figure 6:
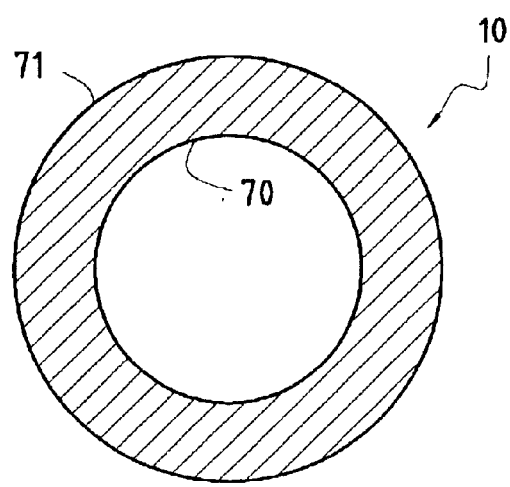
FIG. 6 is a cross-sectional view of another pyrotechnic charge that can be housed in the flexible element.

FIGS. 3 to 5 show three examples of a pyrotechnic charge that can form the block 10. In these three cases, the block 10 possesses, on the one hand, a central channel 35, 36, 37 having a diameter of between 0.9 and 1.5 millimeters and, on the other hand, a side wall 38, 39, 40 provided over its entire length with protuberances 41, 42, 43. FIG. 6 shows that the block 10 may also be produced in the form of a tube possessing a side wall 71 and a central channel 70. In all cases, the block 10 advantageously consists of a composite propellant comprising a charge based on ammonium perchlorate and sodium nitrate, and an inert binder.

In the event of an impact requiring the airbag to inflate in order to protect the occupant, the generator unit 1 operates in the following manner. The electropyrotechnic igniter 3 ignites the two booster charges 11 and 17. The booster charge 11 very rapidly initiates the combustion of the block 10, which within a few milliseconds generates a large amount of gas that can escape via the outlet orifices 15. Finally, the airbag is fully inflated within a time period not exceeding 30 milliseconds.

After the block 10 has stopped burning, the booster charge 17 forces the solid end 8 of the ring 4 to rupture and the pressurized gas 19 contained in the reservoir 18 can slowly escape through the narrow central passage of the metal piece 21, then pass through the second channel 7 and the body 2, and finally set off in the opposite direction to penetrate the now empty tube 9. This gas 19 then escapes via the outlet orifices 15 and keeps the airbag fully inflated for a time period of some ten seconds. It is possible to increase or reduce this time period by varying the pressure level and the volume of the gas 19 in the reservoir 18 or else by modifying the diameter of the central passage of the metal piece 21.

What is claimed is:

1. Hybrid gas generator unit used for motor vehicle safety to inflate at least one side airbag, which comprises:

a flexible element containing a pyrotechnic charge and possessing an upstream end and a downstream end;

a reservoir of pressurized gas, said reservoir having an upstream end and a downstream end; and an electropyrotechnic igniter housed in a body near the upstream end of the flexible element and the downstream end of the reservoir;

the said igniter being capable during operation, of initiating the combustion of the pyrotechnic charge contained in the flexible element and, of causing the pressurized gas contained in the reservoir to be released, wherein the gas generator unit is designed so that, after combustion of the pyrotechnic charge, the pressurized gas escapes firstly from the reservoir in order to pass through the body and then sets off in the opposite direction to pass through the flexible element.

2. Generator unit according to claim 1, characterized in that the pyrotechnic charge contained in the flexible element generates a volume of gas that inflates the airbag in a time period of less than forty milliseconds.

3. Generator unit according to claim 1, characterized in that, in operation, the pressurized gas contained in the reservoir is released so as to keep the airbag inflated for a time period of about ten seconds.

4. Generator unit according to claim 1, characterized in that the pyrotechnic charge contained in the flexible element is produced in the form of a cylindrical block provided with a central channel.

5. Generator unit according to claim 1, characterized in that the pyrotechnic charge contained in the flexible element comprises a composite propellant comprising a charge based on ammonium perchlorate, sodium nitrate and an inert binder.

6. Generator unit according to claim 1, characterized in that a heat-shrunk pliant sleeve grips and confines the pyrotechnic charge contained in the flexible element.

7. Generator unit according to claim 1, characterized in that the igniter initiates the combustion of the pyrotechnic charge contained in the flexible element and causes the pressurized gas contained in the reservoir to be released by means of booster charges.

8. Generator unit according to claim 1, characterized in that the flexible element is produced using a pliant tube made of a thermoplastic, provided with outlet orifices uniformly distributed over its circumference and along its length.

9. Generator unit according to claim 1, characterized in that the upstream end of the flexible element and the downstream end of the reservoir are attached to a ring which is fastened in the body.

\* \* \* \* \*

UNITED STATES PATENT AND TRADEMARK OFFICE
CERTIFICATE OF CORRECTION

PATENT NO. : 6,779,811 B2
DATED : August 24, 2004
INVENTOR(S) : Franck Lebaudy, Francois Peremarty and Christian Perotto It is certified that error appears in the above-identified patent and that said Letters Patent is hereby corrected as shown below:

Column 1,
Lines 23-24, change "occupants, not only when the vehicle rolls over after a side impact." to -- occupants, not only when the vehicle suffers a side impact, but also when the vehicle rolls over after a side impact. --.

Column 4,
Line 20, change "the said" to -- said --.

Signed and Sealed this

Eighth Day of February, 2005

JON W. DUDAS
*Director of the United States Patent and Trademark Office*